United States Patent
Ito et al.

(10) Patent No.: US 10,322,709 B2
(45) Date of Patent: Jun. 18, 2019

(54) VEHICLE CONTROL APPARATUS

(71) Applicant: TOYOTA JIDOSHA KABUSHIKI KAISHA, Toyota-shi, Aichi-ken (JP)

(72) Inventors: Hironori Ito, Gotemba (JP); Akira Nagae, Susono (JP); Ryo Inomata, Hiratsuka (JP); Masayuki Ikeda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/907,460

(22) Filed: Feb. 28, 2018

(65) Prior Publication Data

US 2018/0281771 A1 Oct. 4, 2018

(30) Foreign Application Priority Data

Mar. 30, 2017 (JP) .................. 2017-067133

(51) Int. Cl.

| B60W 10/08 | (2006.01) |
| G08G 1/16 | (2006.01) |
| B60W 40/10 | (2012.01) |
| B60W 30/12 | (2006.01) |
| B60W 10/184 | (2012.01) |
| G05D 1/02 | (2006.01) |
| B60W 10/06 | (2006.01) |

(52) U.S. Cl.
CPC .......... *B60W 10/06* (2013.01); *B60W 10/184* (2013.01); *B60W 30/12* (2013.01); *B60W 40/10* (2013.01); *G05D 1/021* (2013.01); *G08G 1/167* (2013.01); *B60W 2710/0644* (2013.01); *B60W 2710/18* (2013.01); *B60W 2720/14* (2013.01); *G05D 2201/0213* (2013.01)

(58) Field of Classification Search
None
See application file for complete search history.

(56) References Cited

U.S. PATENT DOCUMENTS

2011/0046864 A1* 2/2011 Kamiya ............ F02N 11/0833
701/102
2015/0259008 A1 9/2015 Seguchi

FOREIGN PATENT DOCUMENTS

| JP | 2006-282168 A | 10/2006 |
| JP | 2014156242 A * | 8/2014 |
| WO | 2014/102884 A1 | 7/2014 |

* cited by examiner

*Primary Examiner* — Jelani A Smith
*Assistant Examiner* — Kelly D Williams
(74) *Attorney, Agent, or Firm* — Sughrue Mion, PLLC

(57) ABSTRACT

A vehicle control apparatus is mounted on a vehicle, which includes an engine and a motor configured to start the engine. The vehicle control apparatus is provided with: a first controller programmed to perform a departure prevention control, which is to prevent the vehicle from departing from a driving lane, when the vehicle is about to depart from the driving lane; and a second controller programmed to perform an automatic stop control, which is to automatically stop the engine on condition that a predetermined stop condition is satisfied, and which is to operate the motor and to restart the engine on condition that a predetermined start condition is satisfied after the engine is automatically stopped. The first controller is programmed to prohibit a start of an automatic stop of the engine by the automatic stop control, when the vehicle is about to depart from the driving lane.

2 Claims, 7 Drawing Sheets

VEHICLE CONTROL APPARATUS

CROSS-REFERENCE TO RELATED APPLICATIONS

This application is based upon and claims the benefit of priority of the prior Japanese Patent Application No. 2017-067133, filed on Mar. 30, 2017, the entire contents of which are incorporated herein by reference.

BACKGROUND

1. Technical Field

Embodiments of the present disclosure relate to a vehicle control apparatus configured to prevent a vehicle from departing or deviating from a driving lane on which the vehicle is currently running.

2. Description of the Related Art

For this type of apparatus, for example, there is proposed an apparatus configured to generate a yaw moment in a direction of avoiding lane departure by using a braking force difference between left and right wheels when it is determined that a subject vehicle or a host vehicle departs from a driving lane (refer to Japanese Patent Application Laid Open No. 2006-282168 (Patent Literature 1)).

There is also proposed an apparatus provided with a lane keeping assist control mechanism for performing a lane keeping assist control and an idling stop control mechanism for automatically stopping an engine if an automatic stop condition is satisfied, wherein the apparatus is configured to perform the lane keeping assist control without automatically stopping the engine if the automatic stop condition is satisfied at the same time of the lane keeping assist control (refer to International Publication No. WO14/102884 (Patent Literature 2)).

By the way, in order to improve fuel consumption, there is known a free-run control for stopping the engine by blocking a power transmission between the engine and a drive shaft during the running of the vehicle. If there are both the control for avoiding the departure of the subject vehicle from the driving lane and the control for automatically stopping the engine, such as, e.g., the free-run control, the following problems possibly occur. That is, if the engine is automatically stopped, the supply of an electric power generated by an alternator, which is driven by a power from the engine, may be stopped. Then, an electric power supplied to e.g., an electric power steering system (EPS), an electronically controlled brake system (ECB), or the like possibly becomes insufficient. The control for avoiding the departure of the vehicle from the driving lane is thus possibly not appropriately performed.

SUMMARY

In view of the aforementioned problem, it is therefore an object of embodiments of the present disclosure to provide a vehicle control apparatus configured to appropriately prevent a vehicle, which can perform the control for automatically stopping the engine, from departing from a driving lane in the vehicle.

The above object of embodiments of the present disclosure can be achieved by a vehicle control apparatus mounted on a vehicle, which includes an engine and a motor configured to start the engine, the vehicle control apparatus provided with: a first controller programmed to perform a departure prevention control, which is to prevent the vehicle from departing from a driving lane on which the vehicle is currently running, when the vehicle is about to depart from the driving lane; and a second controller programmed to perform an automatic stop control, which is to automatically stop the engine on condition that a predetermined stop condition is satisfied during running of the vehicle, and which is to operate the motor and to restart the engine on condition that a predetermined start condition is satisfied after the engine is automatically stopped, wherein the first controller is programmed to prohibit a start of an automatic stop of the engine by the automatic stop control, when the vehicle is about to depart from the driving lane.

The vehicle control apparatus is provided with the first controller programmed to perform the departure prevention control, and the second controller programmed to perform the automatic stop control. The existing technique/technology can applied to the departure prevention control. A specific example will be described below. The departure prevention control includes, for example, issuing an alert or sounding an alarm for calling a driver's attention when the vehicle is about to depart from the driving lane. In this case, it is expected that a steering wheel is operated by a driver who reacts to the alert and that the departure of the vehicle from the driving lane is prevented. Alternatively, the departure prevention control includes, for example, a control of automatically deflecting the vehicle in a direction of preventing the departure from the driving lane by using an EPS (so-called EPS-LDA: EPS-Lane Departure Alert) when the vehicle is about to depart from the driving lane. The departure prevention control also includes, for example, a control of automatically deflecting the vehicle in the direction of preventing the departure from the driving lane by using a braking force difference between left and right wheels (so-called brake LDA) when the vehicle is about to depart from the driving lane.

On the vehicle control apparatus, the start of the automatic stop of the engine is prohibited when the vehicle is about to depart from the driving lane. It is thus possible to avoid an insufficient electric power supplied to, e.g., the EPS or the like, caused by the stop of the engine, when the vehicle is about to depart from the driving lane. As a result, for example, if the steering wheel is operated by the driver who reacts to the alert, the EPS can output an appropriate assist force. Alternatively, for example, the EPS-LDA and the brake LDA can be appropriately performed. Therefore, according to the vehicle control apparatus, in the vehicle that can perform the automatic control of the engine, it is possible to appropriately prevent the vehicle from departing from the driving lane.

In one aspect of the vehicle control apparatus according to embodiments of the present, the first controller is programmed to prohibit a restart of the engine by the automatic stop control, when the vehicle is about to depart from the driving lane.

According to studies of the present inventors, it has been found that if the motor is operated to start (or restart) the engine, the voltage of a battery is significantly reduced, temporarily, due to the operation of the motor. Thus, if the engine is restarted by the automatic stop control when the vehicle is about to depart from the driving lane, an electric power is possibly not appropriately supplied to e.g., the EPS or the like. In other words, when the vehicle is about to depart from the driving lane in a situation in which the engine is already stopped, a demerit based on the reduction in the voltage of the battery caused by the restart of the engine may be more significant in some cases than a merit based on the restart of the engine.

Thus, in this aspect, the restart of the engine by the automatic stop control is prohibited by the first controller, when the vehicle is about to depart from the driving lane. By virtue of such a configuration, even when the vehicle is about to depart from the driving lane in the situation in which the engine is stopped, it is possible to appropriately operate e.g., the EPS or the like, and it is possible to appropriately prohibit the vehicle from departing from the driving lane.

Alternatively, in another aspect of the vehicle control apparatus according to embodiments of the present, the first controller is programmed to perform, as a part of the departure prevention control, (i) a first determination in which a first departure amount of the vehicle from the driving lane is estimated and in which it is determined whether or not the estimated first departure amount is greater than a first threshold value, and (ii) a second determination in which a second departure amount of the vehicle from the driving lane is estimated at a different time from an estimation time of the first departure amount and in which it is determined whether or not the estimated second departure amount is greater than a second threshold value, which is greater than the first threshold value, and the first controller is programmed (i) to control the motor to restart the engine on condition that the engine is automatically stopped by the automatic stop control, if it is determined in the first determination that the first departure amount is greater than the first threshold value, and (ii) to prohibit the start of the automatic stop of the engine by the automatic stop control, if it is determined in the second determination that the second departure amount is greater than the second threshold value.

In this aspect, the possibility of the departure of the vehicle from the driving lane is determined at two stages. If it is determined in the second determination that the second departure amount is greater than the second threshold value, the vehicle more likely departs from the driving lane, and some specific operation or control is required to prevent the vehicle from departing from the driving lane. On the other hand, if it is determined in the first determination that the first departure amount is greater than the first threshold value, the vehicle relatively likely departs from the driving lane in a near future (e.g. in several hundred milliseconds to several seconds) even though the vehicle may depart from the driving lane, less likely, than when it is determined in the second determination that the second departure amount is greater than the second threshold value. With regard to the first departure amount and the second departure amount, estimation times thereof are different (typically, the second departure amount is estimated after the first departure amount), but the estimation method thereof is the same. Moreover, the expression "if it is determined in the second determination that the second departure amount is greater than the second threshold value" corresponds to the aforementioned expression "when the vehicle is about to depart from the driving lane".

In this aspect, if it is determined in the first determination that the first departure amount is greater than the first threshold value when the engine is stopped by the automatic stop control, the engine is restarted in preparation for the operation or control for preventing the vehicle from departing from the driving lane, wherein the departure is likely performed in the near future. Moreover, in this aspect, if it is determined in the second determination that the second departure amount is greater than the second threshold value, the start of the automatic stop of the engine by the automatic stop control is prohibited.

By virtue of such a configuration, the engine is restarted in advance when the vehicle is about to depart from the driving lane. It is thus possible to stabilize the supply of an electric power to e.g., the EPS or the like. It is also possible to avoid an insufficient electric power supplied to e.g., the EPS of the like, caused by the stop of the engine, when the vehicle is about to depart from the driving lane.

In this aspect, the first controller may be programmed to prohibit a restart of the engine by the automatic stop control, if it is determined in the second determination that the second departure amount is greater than the second threshold value.

By virtue of such a configuration, if the vehicle more likely departs from the driving lane in the situation in which the engine is stopped, it is possible to avoid the reduction in the voltage of the battery caused by the restart of the engine, and it is possible to appropriately operate e.g., the EPS or the like.

In this aspect, the first controller may be programmed to generate a braking force difference between left and right wheels so that a yaw moment in a direction of preventing the vehicle from departing from the driving lane is applied to the vehicle, if it is determined in the second determination that the second departure amount is greater than the second threshold value.

By virtue of such a configuration, it is possible to automatically prevent the vehicle from departing from the driving lane if the vehicle more likely departs from the driving lane, which is extremely useful in practice.

The nature, utility, and further features of this disclosure will be more clearly apparent from the following detailed description with reference to embodiments of the disclosure when read in conjunction with the accompanying drawings briefly described below.

DETAILED DESCRIPTION OF THE EMBODIMENTS

A vehicle control apparatus according to embodiments of the present disclosure will be explained with reference to the drawings. In the following embodiments, a vehicle equipped with the vehicle control apparatus according to embodiments of the present disclosure is used for explanation. Moreover, in the following embodiments, a specific example of the automatic stop control according to the present disclosure is a free-run control.

First Embodiment

A vehicle control apparatus according to a first embodiment of the present disclosure will be explained with reference to FIG. 1 to FIG. 3B.

(Configuration of Vehicle)

Figure 1:
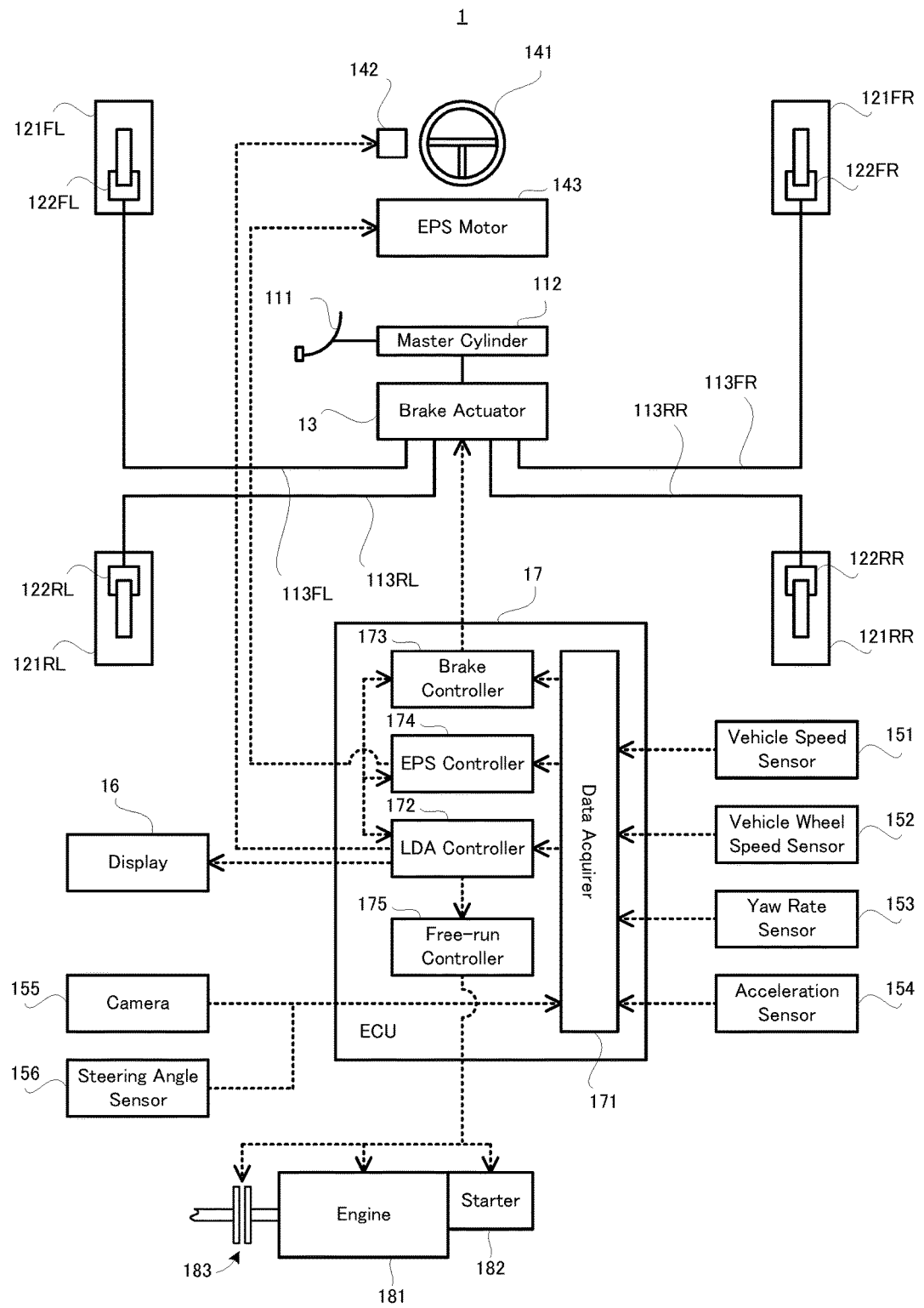
FIG. 1 is a block diagram illustrating a configuration of a vehicle according to a first embodiment.

A configuration of a vehicle 1 equipped with the vehicle control apparatus according to the first embodiment will be explained with reference to FIG. 1. FIG. 1 is a block diagram illustrating the configuration of the vehicle 1 according to the first embodiment.

In FIG. 1, the vehicle 1 is provided with a brake pedal 111, a master cylinder 112, a brake actuator 13, a wheel cylinder 122FL provided on a front left wheel 121FL, a wheel cylinder 122RL provided on a rear left wheel 121RL, a wheel cylinder 122FR provided on a front right wheel 121FR, a wheel cylinder 122RR provided on a rear right wheel 121RR, and brake pipes 113FL, 113RL, 113FR, and 113RR.

The vehicle 1 is further provided with a steering wheel 141, a vibration actuator 142, an EPS motor 143, a vehicle speed sensor 151, a vehicle wheel speed sensor 152, a yaw rate sensor 153, an acceleration sensor 154, a camera 155, a steering angle sensor 156, a display 16, an electronic control unit (ECU) 17, which is a specific example of the "vehicle control apparatus", an engine 181, a starter 182, and a clutch mechanism 183.

The master cylinder 112 is configured to adjust a pressure of brake fluid (or any fluid) in the master cylinder 112 in accordance with a step amount of the brake pedal 111. The pressure of the brake fluid in the master cylinder 112 is transmitted to the wheel cylinders 122FL, 122RL, 122FR, and 122RR respectively via the brake pipes 113FL, 113RL, 113FR, and 113RR. As a result, braking forces corresponding to pressures of the brake fluid transmitted to the wheel cylinders 122FL, 122RL, 122FR, and 122RR are respectively applied to the front left wheel 121FL, the rear left wheel 121RL, the front right wheel 121FR, and the rear right wheel 121RR.

The brake actuator 13 is configured to adjust the pressure of the brake fluid transmitted to each of the wheel cylinders 122FL, 122RL, 122FR, and 122RR, independently of the step amount of the brake pedal 111, under control of the ECU 17. Therefore, the brake actuator 13 is configured to adjust the braking force applied to each of the front left wheel 121FL, the rear left wheel 121RL, the front right wheel 121FR, and the rear right wheel 121RR, independently of the step amount of the brake pedal 111.

The steering wheel 141 is an operator operated by a driver to steer the vehicle 1 (i.e., to turn wheels to be steered or turned). The vibration actuator 142 is configured to vibrate the steering wheel 141, under the control of the ECU 17. The EPS motor 143 is configured to output an assist force for assisting the operation of the steering wheel 141 by the driver, under the control of the ECU 17. In addition, the EPS motor 143 is configured to give a steering angle to the wheels to be steered or turned, independently of the operation of the steering wheel 141 by the driver, under the control of the ECU 17.

The starter 182 is configured to drive a crankshaft of the engine 181 before a start of the engine 181. The starter 182 may be realized not only by a starter motor only for starting the engine, but also by e.g., a motor generator mounted on a hybrid vehicle or the like. The clutch mechanism 183 is configured to block a power transmission between the engine 181 and drive wheels.

The ECU 17 is programmed or configured to control the entire operation of the vehicle 1. Particularly in the first embodiment, the ECU 17 is configured to perform a lane departure preventing operation for preventing the departure or deviation of the vehicle 1 from a driving lane on which the vehicle 1 is currently running, and to perform the free-run control. The ECU 17 is provided with a data acquirer 171, a LDA controller 172, and a brake controller 173, as processing blocks logically realized or processing circuits physically realized inside the ECU 17, in order to perform the lane departure preventing operation. The ECU 17 is provided with a free-run controller 175, as a processing block logically realized or a processing circuit physically realized inside the ECU 17, in order to perform the free-run control. The ECU 17 is provided with an EPS controller 174, as a processing block logically realized or a processing circuit physically realized inside the ECU 17, in order to control the EPS motor 143.

(Free-Run Control)

Various existing aspects can be applied to the free-run control, and a detailed explanation of the free-run control will be thus omitted. Here, only an outline of the free-run control will be described.

The free-run controller 175 is programmed or configured to control the clutch mechanism 184 to block the power transmission between the engine 181 and the drive wheels and is programmed or configured to stop the engine 181, on condition that a predetermined stop condition is satisfied, during the running of the vehicle 1. The free-run controller 175 is programmed or configured to control the starter 182 to start the engine 181 and is programmed or configured to control the clutch mechanism 183 to transmit the power between the engine 181 and the drive wheels, on condition that a predetermined start condition is satisfied, during a free run of the vehicle 1.

The predetermined stop condition includes, for example, that the brake pedal 111 is not stepped on by the driver (i.e., brake off), and that a not-illustrated accelerator pedal is not stepped on by the drier (i.e., accelerator off), and that the clutch mechanism 183 is engaged so that a so-called engine brake is applied to the vehicle 1. The predetermined start condition includes, for example, that the accelerator pedal is stopped by the driver.

(Lane Departure Preventing Operation)

Next, the lane departure preventing operation according to the first embodiment will be explained with reference to a flowchart in FIG. 2.

Figure 2:
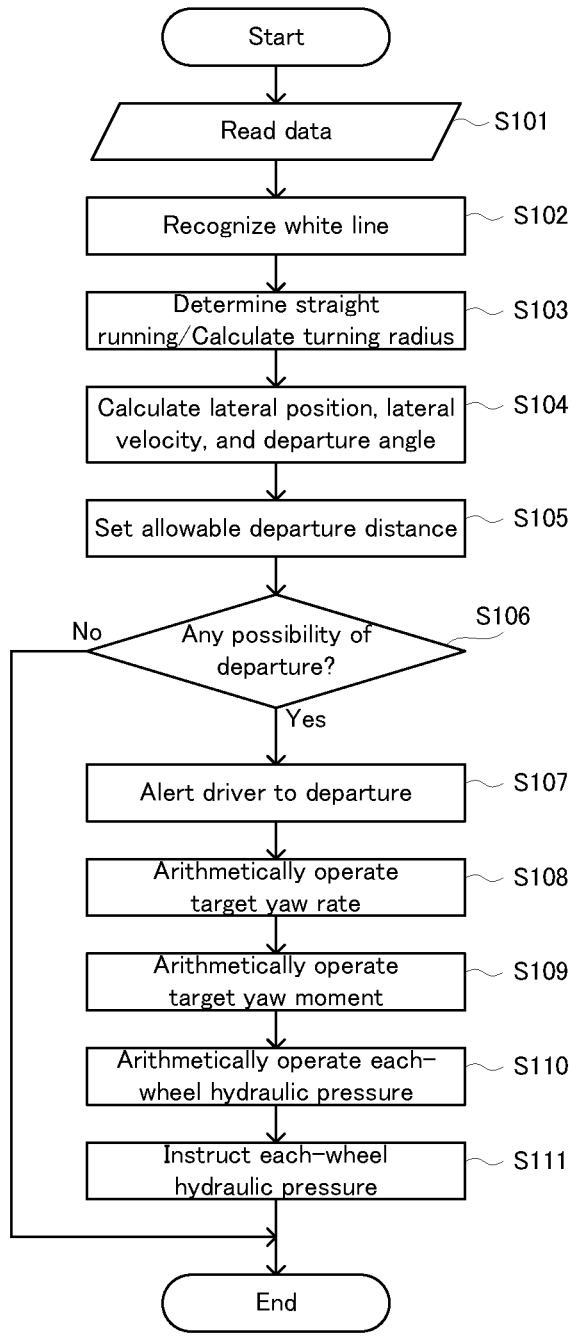
FIG. 2 is a flowchart illustrating a lane departure preventing operation according to the first embodiment.

In FIG. 2, firstly, the data acquirer 171 obtains detection data indicating detection results of the vehicle speed sensor 151, the vehicle wheel speed sensor 152, the yaw rate sensor 153, the acceleration sensor 154, and the steering angle sensor 156, and image data indicating images taken by the camera 155 (step S101).

The LDA controller 172 analyzes the image data obtained in the step S101, thereby specifying a lane edge of the driving lane on which the vehicle 1 is currently running (or a "white line" disclosed in the first embodiment as an example of the lane edge) in the images taken by the camera 155 (step S102). A detailed explanation of a method of recognizing the white line will be omitted because the existing technique/technology can be applied to the method.

The LDA controller 172 determines whether or not the driving lane on which the vehicle 1 is currently running is a straight lane or a curve, on the basis of the white line specified in the step S102, and calculates a curvature radius of the driving lane if the driving lane is determined to be the curve (step S103). The curvature radius of the driving lane is substantially equivalent to a curvature radius of the white line. Thus, the LDA controller 172 may calculate the curvature radius of the white line specified in the step S102 and may treat the calculated curvature radius as the curvature radius of the driving lane.

The LDA controller 172 further calculates a current lateral position, a current lateral velocity, and a current departure angle of the vehicle 1, on the basis of the white line specified in the step S102 (step S104). Here, the "lateral position" means a distance from the center of the driving lane to the vehicle 1 (or typically, a distance to the center of the vehicle 1) in a lane width direction, which is orthogonal to a direction in which the driving lane extends (or a lane extension direction). The "lateral velocity" means a velocity of the vehicle 1 in the lane width direction. The "departure angle" means an angle made by the driving lane and a longitudinal direction axis of the vehicle 1 (i.e., an angle made by the white line and the longitudinal direction axis of the vehicle 1).

The LDA controller 172 further sets an allowable departure distance (step S105). The allowable departure distance indicates an allowable maximum value of a departure distance of the vehicle 1 from the driving lane (i.e. a departure distance of the vehicle 1 from the white line) when the vehicle 1 departs from the driving lane.

For example, the allowable departure distance may be set in the following manner; namely, the LDA controller 172 may set the allowable departure distance from the viewpoint of satisfying requirements of law and regulations (e.g., requirements of new car assessment programme (NCAP)). A method of setting the allowable departure distance is not limited to this example.

Then, the LDA controller 172 determines whether or not there is a possibility that the vehicle 1 departs from the driving lane on which the vehicle 1 is currently running (step S106). Specifically, for example, the LDA controller 172 may calculate a future position (e.g., in several to several ten seconds) of the vehicle 1, on the basis of a current velocity, the current lateral position, the current lateral velocity, or the like of the vehicle 1. The LDA controller 172 may compare the future position of the vehicle 1 with the center of the driving lane, thereby calculating a departure amount of the vehicle 1. An example of the departure amount is a shift amount of the future position of the vehicle 1 from the center of the driving lane in the lane width direction. Then, the LDA controller 172 may determine whether or not the departure amount of the vehicle 1 is greater than a predetermined determination value. If it is determined that the departure amount of the vehicle 1 is greater than the predetermined determination value (e.g., if the vehicle 1 goes across or is on the white line in the future position), the LDA controller 172 may determine that there is the possibility that the vehicle 1 departs from the driving lane.

In the determination in the step S106, if it is determined that there is no possibility that the vehicle 1 departs from the driving lane (the step S106: No), the lane departure preventing operation illustrated in FIG. 2 is ended. Then, the LDA controller 172 may restart the lane departure preventing operation illustrated in FIG. 2 after a lapse of a first predetermined period (e.g., several milliseconds to several ten milliseconds). In other words, the lane departure preventing operation illustrated in FIG. 2 may be repeated with a period corresponding to the first predetermined period.

On the other hand, in the determination in the step S106, if it is determined that there is the possibility that the vehicle 1 departs from the driving lane (i.e., when the vehicle 1 is about to depart from the driving lane) (the step S106: Yes), the LDA controller 172 alerts the driver of the vehicle 1 to the possibility of the departure of the vehicle 1 from the driving lane (step S107). Specifically, the LDA controller 172 may control the display 16, for example, to display an image indicating the possibility of the departure of the vehicle 1 from the driving lane, and/or may control the vibration actuator 142 to inform the driver of the possibility of the departure of the vehicle 1 from the driving lane by using the vibration of the steering wheel 141.

In parallel with the step S107, the LDS controller 172 performs a departure avoidance control (steps S108 to S111). At this time, the LDA controller 172 may turn on a flag associated with the departure avoidance control. Here, the departure avoidance control is a control in which a yaw moment in a direction of avoiding the departure is applied to the vehicle 1 so that the departure distance of the vehicle 1 from the driving lane is within the allowable departure distance.

In the departure avoidance control according to the first embodiment, a braking force may be applied to at least one of the front left wheel 121FL, the rear left wheel 121RL, the front right wheel 121FR, and the rear right wheel 121RR so that there is a braking force difference between the left and right wheels. As a result, the yaw moment in the direction of avoiding the departure may be applied to the vehicle 1. In other words, the departure avoidance control according to the first embodiment may be so-called brake LDA. Hereinafter, the departure avoidance control will be specifically explained.

The LDA controller 172 arithmetically operates a target yaw rate so that the vehicle 1, which is leaving from the center of the driving lane, runs along a target track that is directed to the center of the driving lane (i.e., a traveling line to be targeted) (step S108).

The LDA controller 172 then calculates a yaw moment to be applied to the vehicle 1 as a target yaw moment, in order to generate the target yaw rate in the vehicle 1 (step S109). For example, the LDA controller 172 may calculate the target yaw moment by converting the target yaw rate to the target yaw moment on the basis of a predetermined transfer function.

The LDA controller 172 then may calculate a braking force that can achieve the target yaw moment. At this time, the LDA controller 172 may individually calculate the braking forces applied to the front left wheel 121FL, the rear left wheel 121RL, the front right wheel 121FR, and the rear right wheel 121RR. The LDA controller 172 may transmit a signal indicating the calculated braking force to the brake controller 173.

The brake controller 173 calculates a pressure command value for designating the pressure of the brake fluid required to generate the braking force, on condition that the signal indicating the braking force is received from the LDA controller 172 (step S110). At this time, the brake controller 173 may individually calculate the pressure command values for designating the pressures of the brake fluid inside the wheel cylinders 122FL, 122RL, 122FR, and 122RR.

The brake controller 173 then controls the brake actuator 13 on the basis of the pressure command value (step S111). As a result, the braking force corresponding to the pressure command value may be applied to at least one of the front left wheel 121FL, the rear left wheel 121RL, the front right wheel 121FR, and the rear right wheel 121RR. In other words, the yaw moment in the direction of avoiding the departure may be applied to the vehicle 1 due to the braking force difference between the left and right wheels.

The LDA controller 172 then may restart the lane departure preventing operation illustrated in FIG. 2 after a lapse of the first predetermined period. At this time, the flag associated with the departure avoidance control is on, and thus, the lane departure preventing operation is started while the yaw moment caused by the departure avoidance control is applied to the vehicle 1.

In the determination in the step S106 performed again, if it is determined that there is the possibility that the vehicle 1 departs from the driving lane (the step S106: Yes), the process after the step S107 is performed. Thus, the application of the yaw moment caused by the departure avoidance control to the vehicle 1 may be continued. On the other hand, in the determination in the step S106 performed again, if it is determined that there is no possibility that the vehicle 1 departs from the driving lane (the step S106: No), the flag associated with the departure avoidance control is turned off, and the application of the yaw moment caused by the departure avoidance control to the vehicle 1 is ended.

(Influence of Free-Run Control on Lane Departure Preventing Operation)

Next, an influence on the lane departure preventing operation caused by the implementation of the free-run control will be explained. The free-run control is independent of the lane departure preventing operation. Thus, if no measures are taken, the free-run control may be performed independently of the lane departure preventing operation. In other words, if the predetermined stop condition is satisfied, the engine 181 may be automatically stopped by the free-run control even though there is the possibility that the vehicle 1 departs from the driving lane. Alternatively, if the predetermined start condition is satisfied, the engine 181 may be restarted by the free-run control, even though there is the possibility that the vehicle 1 departs from the driving lane.

If the engine 181 is automatically stopped by the free-run control when there is the possibility that the vehicle 1 departs from the driving lane, the supply of an electric power generated by a not-illustrated alternator, which is driven by the power from the engine 181, may be stopped. Then, an electric power supplied to e.g., the brake actuator 13 or the like possibly becomes insufficient. There is thus a possibility that the braking force difference between the left and right wheels cannot be appropriately generated, if the braking force difference between the left and right wheels is generated by the brake actuator 13 in order to prevent the vehicle 1 from departing from the driving lane. In other words, an effect that is expected for the lane departure preventing operation may not be appropriately exhibited.

Alternatively, if the engine 181, which is automatically stopped, is restarted by the free-run control when there is the possibility that the vehicle 1 departs from the driving lane, the voltage of a not-illustrated battery may be significantly reduced, temporarily, due to the operation of the starter 182. Then, an electric power is possibly not appropriately supplied to e.g., the brake actuator 13, from the battery. There is thus a possibility that the braking force difference between the left and right wheels cannot be appropriately generated, if the braking force difference between the left and right wheels is generated by the brake actuator 13 in order to prevent the vehicle 1 from departing from the driving lane. In other words, the effect that is expected for the lane departure preventing operation may not be appropriately exhibited.

If the engine 181 is automatically stopped by the free-run control when the vehicle 1 is provided with a vacuum brake booster, an intake negative pressure of the engine 181 may be reduced, and an assist force caused by the intake negative pressure working on the vacuum brake booster may be thus reduced. For example, in a situation in which the engine 181 is automatically stopped, if the driver reacts to the alert in the step S107 in FIG. 2 and steps on the brake pedal 111 to avoid the departure of the vehicle 1 form the driving lane, the driver possibly feels that the brake pedal 111 is heavy.

In the first embodiment, an arbitration process explained below is performed in order to suppress or eliminate the influence of the free-run control on the lane departure preventing operation described above.

(Arbitration Process)

An arbitration process according to the first embodiment will be explained with reference to a flowchart in FIG. 3A. The arbitration process illustrated in FIG. 3A is performed in parallel with the lane departure preventing operation illustrated in FIG. 2.

Figure 3A:
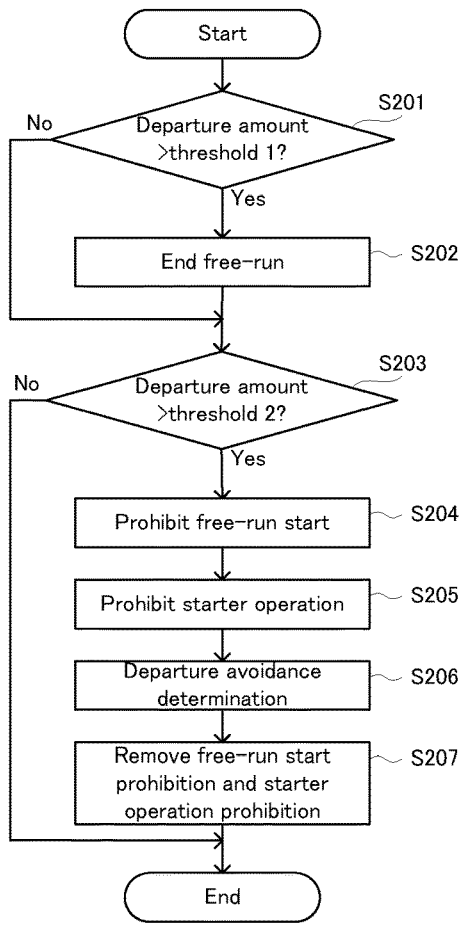
FIG. 3A is a flowchart illustrating an arbitration process according to the first embodiment.

In FIG. 3A, the LDA controller 172 determines whether or not the departure amount of the vehicle 1 is greater than a threshold value 1 (step S201). Here, typically, the LDA controller 172 substantially obtains the departure amount calculated in the step S106 in FIG. 2, and performs the determination in the step S201 and a determination in a step S203 described later. The LDA controller 172 may calculate the departure amount of the vehicle 1 on its own in the arbitration process.

In the determination in the step S201, if it is determined that the departure amount is less than or equal to the threshold value 1 (the step S201: No), the determination in the step S203 described later is performed. On the other hand, in the determination in the step S201, if it is determined that the departure amount is greater than the threshold value 1 (the step S201: Yes), the LDA controller 172 restarts the engine 181 via the free-run controller 175 on condition that the engine 181 is automatically stopped by the free-run control, and ends the free-run (step S202).

The LDA controller 172 then determines whether or not the departure amount of the vehicle 1 (which is a departure amount calculated after the departure amount used in the determination in the step S201) is greater than a threshold value 2 (step S203). In the determination, if it is determined that the departure amount is less than or equal to the threshold value 2 (the step S203: No), the arbitration process illustrated in FIG. 3A is ended. Then, the LDA controller 172 may restart the arbitration process illustrated in FIG. 3A after a lapse of a second predetermined period (e.g., several milliseconds to several ten milliseconds). In other words, the arbitration process illustrated in FIG. 3A may be repeated with a period corresponding to the second predetermined period.

On the other hand, in the determination in the step S203, if it is determined that the departure amount is greater than the threshold value 2 (the step S203: Yes), the LDA controller 172 prohibits the start of the free-run by the free-run control (and particularly, prohibits the start of the automatic stop of the engine 181) (step S204). In parallel with the step S204, the LDA controller 172 prohibits the restart of the engine 181 by the free-run control (and particularly, prohibits the operation of the starter 182) (step S205).

The LDA controller 172 then performs a departure avoidance determination (step S206). The departure avoidance determination is to determine whether or not the departure of the vehicle 1 from the driving lane is avoided by the lane departure preventing operation (and particularly, the departure avoidance control) illustrated in FIG. 2. In this determination, the LDA controller 172 may determine that the departure of the vehicle 1 from the driving lane is avoided when the flag associated with the departure avoidance control is off. The LDA controller 172 may repeat the departure avoidance determination until it is determined that the departure of the vehicle 1 from the driving lane is avoided.

After the step S206 (i.e., after the departure of the vehicle 1 from the driving lane is avoided), the LDA controller 172 removes or cancels the prohibition of the start of the free-run by the free-run control and the prohibition of the restart of the engine 181 by the free-run control (step S207). The LDA controller 172 then restarts the arbitration process illustrated in FIG. 3A after a lapse of the second predetermined period.

Figure 3B:
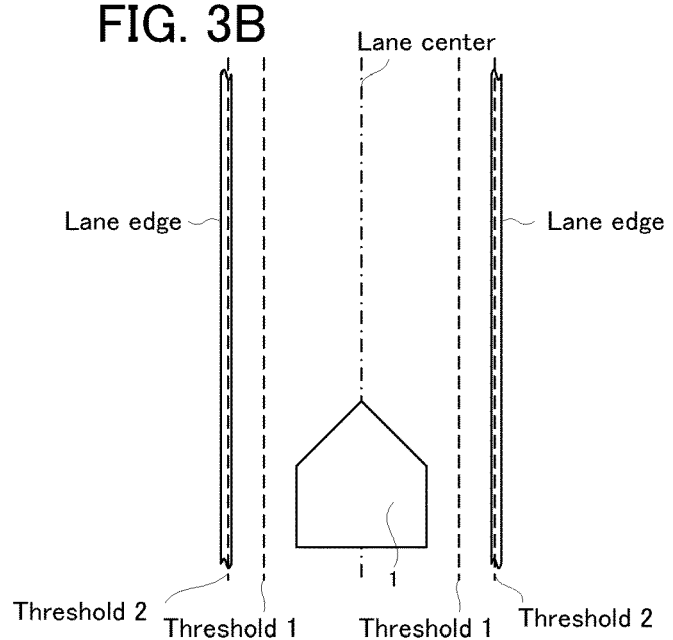
FIG. 3B is a diagram illustrating threshold values according to the first embodiment.

Here, the threshold values 1 and 2 will be explained with reference to FIG. 3B. First, the expression "the departure amount of the vehicle 1 is greater than the threshold value 1" means that at least a part of the vehicle 1 will be located closer to the lane edge (i.e., the white line herein) in the future than a dashed line indicating the threshold value 1. In the same manner, the expression "the departure amount of the vehicle 1 is greater than the threshold value 1" means that at least a part of the vehicle 1 will be located closer to the lane edge (or outside the lane) in the future than a dashed line indicating the threshold value 2.

As described above, if it is determined that the departure amount of the vehicle 1 is greater than the threshold value 1 and if the engine 181 is automatically stopped, then, the engine 181 may be restarted. As explained in "Influence of Free-Run Control on Lane Departure Preventing Operation", if the starter 182 is operated in order to restart the engine 181, the voltage of the battery may be reduced. The reduction in the voltage of the battery continues, for example, for several hundred milliseconds to one second. Therefore, if the departure avoidance control is performed while the voltage of the battery is reduced, an electric power is possibly not appropriately supplied to the brake actuator 13.

Thus, the threshold value 1 is set as a value that is closer to the center of the driving lane than the determination value used in the step S106 of the lane departure preventing operation illustrated in FIG. 2 (i.e., the determination value for determining whether or not the departure avoidance control is started), and as a value that allows the restart of the engine 181 to be completed before the start of the departure avoidance control (or a value that at least allows the reduction in the voltage of the battery to be eliminated) even though it is determined that the departure amount of the vehicle 1 is greater than the threshold value 1 and the engine 181 is restarted.

On the other hand, the threshold value 2 is set as a value that is equal to or close to the determination value used in the step S106 of the lane departure preventing operation illustrated in FIG. 2. In other words, the threshold value 2 is a value that is set on the premise that the departure avoidance control is performed if the departure amount of the vehicle 1 is greater than the threshold value 2. Therefore, it can be said that when it is determined that the departure amount of the vehicle 1 is greater than the threshold value 2 is when it is determined, in the determination in the step S106 of the lane departure preventing operation illustrated in FIG. 2, that there is the possibility that the vehicle 1 departs from the driving lane on which the vehicle 1 is currently running.

(Technical Effect)

1. When the Vehicle 1 is not in Free-Run (i.e., when the Engine 181 is Driven):

If it is determined that the departure amount of the vehicle 1 is greater than the threshold value 2, the start of the free-run is prohibited by the LDA controller 172. Thus, the engine 181 is not automatically stopped when there is the possibility that the vehicle 1 departs from the driving lane. It is thus possible to avoid an insufficient electric power supplied to, e.g., the brake actuator 13 or the like. As a result, the lane departure preventing operation (and particularly, the departure avoidance control) makes it possible to appropriately prevent the vehicle 1 from departing from the driving lane.

2. When the Vehicle 1 is in Free-Run (1):

If it is determined that the departure amount of the vehicle 1 is greater than the threshold value 1, the engine 191 is restarted by the LDA controller 172. Then, if it is determined that the departure amount of the vehicle 1 is greater than the threshold value 2, the start of the free-run is prohibited by the LDA controller 172. As a result, the lane departure preventing operation (and particularly, the departure avoidance control) makes it possible to appropriately prevent the vehicle 1 from departing from the driving lane.

Upon implementation of the departure avoidance control, which allows the braking force difference to be generated between the left and right wheels, the driver relatively more likely accelerates the vehicle 1 after implementation of the departure avoidance control because the vehicle 1 is more or less decelerated. If it is determined that the departure amount of the vehicle 1 is greater than the threshold value 1, the engine 181 is restarted by the LDA controller 172 before it is determined that the departure amount of the vehicle 1 is greater than the threshold value 2 (i.e., before the start of the departure avoidance control). It is therefore possible to ensure acceleration responsiveness after the implementation of the departure avoidance control.

3. When the Vehicle 1 is in Free-Run (2):

After it is determined that the departure amount of the vehicle 1 is less than or equal to the threshold value 1, it may be determined in some cases that the departure amount of the vehicle 1 is greater than the threshold value 2, for example, due to an uneven road surface, wind, the operation of the steering wheel 141 by the driver, or the like. In this case, the step S202 (i.e., the restart of the engine 181) is not performed as shown in FIG. 3A. In other words, the departure avoidance control is performed during the free-run of the vehicle 1.

After it is determined that the departure amount of the vehicle 1 is greater than the threshold value 2, if the predetermined start condition is satisfied and the engine 181 is restarted by the free-run control, then, the timing of the reduction in the voltage of the battery caused by the operation of the starter 182 possibly overlap the timing of implementation of the departure avoidance control.

In the first embodiment, if it is determined that the departure amount of the vehicle 1 is greater than the threshold value 2, the restart of the engine 181 by the free-run (and particularly, the operation of the starter 182) is prohibited by the LDA controller 172. It is thus possible to avoid the reduction in the voltage of the battery caused by the operation of the starter 182. The lane departure preventing operation (and particularly, the departure avoidance control) therefore makes it possible to appropriately prevent the vehicle 1 from departing from the driving lane.

The "LDA controller 172" and the "free-run controller 175" according to the first embodiment are respectively an example of the "first controller" and the "second controller" according to embodiments of the present disclosure.

Second Embodiment

A vehicle control apparatus according to a second embodiment will be explained with reference to FIG. 4 and FIG. 5. The second embodiment is the same as the first embodiment, except that the lane departure preventing operation and the arbitration process are partially different. Thus, in the second embodiment, the same explanation as that in the first embodiment will be omitted, and the same parts on the drawings will carry the same reference numerals. Basically, a different point will be explained with reference to FIG. 4 and FIG. 5.

(Configuration of Vehicle)

The ECU 17 is provided with the data acquirer 171, the LDA controller 172, and EPS controller 174, in order to perform the lane departure preventing operation. The ECU 17 is provided with the brake controller 173 in order to control the brake actuator 13.

(Lane Departure Preventing Operation)

A lane departure preventing operation according to the second embodiment will be explained with reference to a flowchart in FIG. 4.

Figure 4:
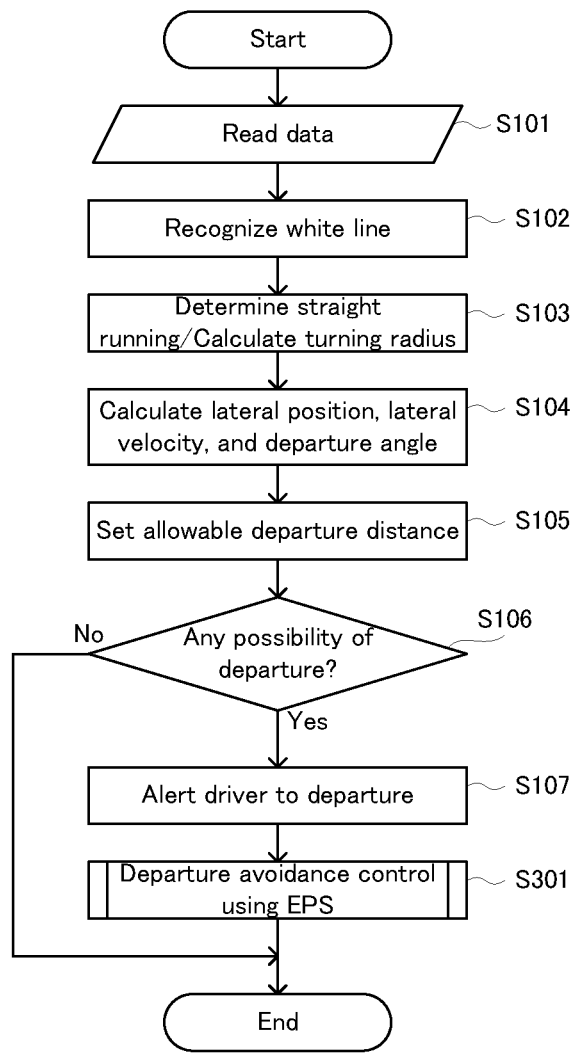
FIG. 4 is a flowchart illustrating a lane departure preventing operation according to a second embodiment.

In FIG. 4, after the step S105, the LDA controller 172 determines whether or not there is a possibility that the vehicle 1 departs from the driving lane on which the vehicle 1 is currently running (the step S106). In the determination, if it is determined that there is no possibility that the vehicle 1 departs from the driving lane (the step S106: No), the lane departure preventing operation illustrated in FIG. 4 is ended. At this time, the LDA controller 172 may turn off the flag associated with the departure avoidance control. The LDA controller 172 then may restart the lane departure preventing operation illustrated in FIG. 4 after a lapse of the first predetermined period.

On the other hand, in the determination in the step S106, if it is determined that there is the possibility that the vehicle 1 departs from the driving lane (the step S106: Yes), the LDA controller 172 alerts the driver of the vehicle 1 to the possibility of the departure of the vehicle 1 from the driving lane (the step S107). In parallel with the step S107, the LDA controller 172 performs a departure avoidance control using an EPS (so-called EPS-LDA) (step S301). At this time, the LDA controller may turn off the flag associated with the departure avoidance control.

A detailed explanation of the EPS-LDA will be omitted because the existing various aspects can be applied to the EPS-LDA. Here, the EPS-LDA will be briefly described.

The EPS-LDA is a control in which a steering torque is applied by the EPS motor 143 in the direction of avoiding the departure so that the departure distance of the vehicle 1 from the driving lane is within the allowable departure distance and in which automatic steering is performed. If it is determined that there is the possibility that the vehicle 1 departs from the driving lane, the LDA controller 172 may calculate a target steering angle so that the vehicle 1 runs along such a target track (i.e., a traveling line to be targeted) that the departure distance of the vehicle 1 from the driving lane is within the allowable departure distance and that lateral acceleration applied to an occupant of the vehicle 1 is within an allowable range (step S108). The EPS controller 174 may calculate a target steering torque for realizing the target steering angle, on the basis of the target steering angle calculated by the LDA controller 172, and may control the EPS motor 143.

(Arbitration Process)

An arbitration process according to the second embodiment will be explained with reference to a flowchart in FIG. 5. The arbitration process illustrated in FIG. 5 is performed in parallel with the lane departure preventing operation illustrated in FIG. 4.

Figure 5:
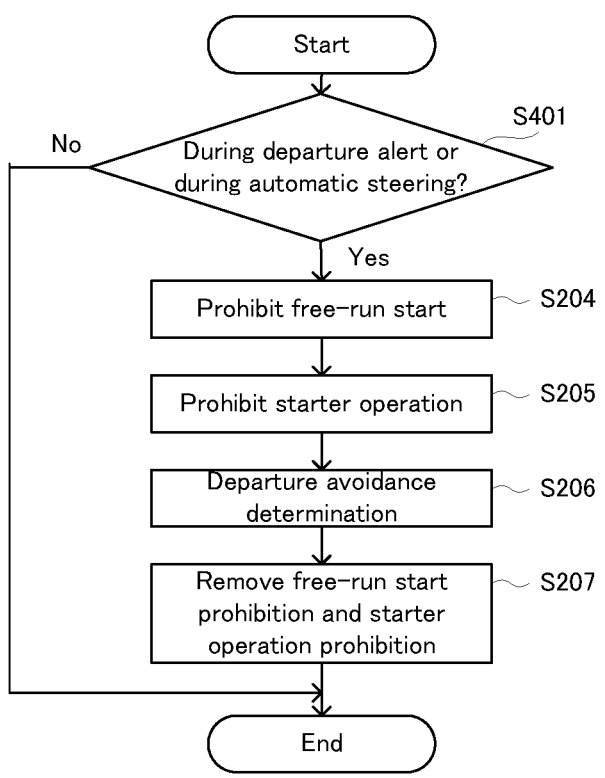
FIG. 5 is a flowchart illustrating an arbitration process according to the second embodiment.

In FIG. 5, the LDA controller 172 determines whether or not the alert in the step S107 in FIG. 4 is issued, or whether or not the automatic steering is performed by the step S301 in FIG. 4 (step S401).

In the determination in the step S401, if it is determined that the alert in the step S107 is issued, or that the automatic steering is performed by the step S301 (i.e., when the vehicle 1 is about to depart from the driving lane) (the step S401: Yes), the process after the step S204 is performed. On the other hand, in the determination in the step S401, if it is determined that the alert in the step S107 is not issued, and that the automatic steering is not performed by the step S301 (the step S401: No), the arbitration process illustrated in FIG. 5 is ended. Instead of the determination in the step S401, it may be determined whether or not the flag associated with the departure avoidance control is on.

(Technical Effect)

1. When the Vehicle 1 is not in Free-Run (i.e., when the Engine 181 is Driven):

If it is determined that the alert in the step S107 in FIG. 4 is issued, or that the automatic steering is performed by the step S301 in FIG. 4, the start of the free-run is prohibited by the LDA controller 172. Thus, the engine 181 is not automatically stopped when there is the possibility that the vehicle 1 departs from the driving lane. It is thus possible to avoid an insufficient electric power supplied to, e.g., the EPS motor 143 or the like. As a result, the lane departure preventing operation (and particularly, the EPS-LDA) makes it possible to appropriately prevent the vehicle 1 from departing from the driving lane.

2. When the Vehicle 1 is in Free-Run:

In the second embodiment, unlike the first embodiment, the engine 181 is not restarted before implementation of the EPS-LDA. In the case of the EPS-LDA, the driver relatively less likely accelerates the vehicle 1 after implementation of the EPS-LDA because the vehicle 1 is hardly decelerated. The EPS-LDA is therefore performed in the free-run of the vehicle 1.

In the second embodiment, if it is determined that the alert in the step S107 in FIG. 4 is issued, or that the automatic steering is performed by the step S301 in FIG. 4, the restart of the engine 181 by the free-run control (and particularly, the operation of the starter 182) is prohibited by the LDA controller 172. It is thus possible to avoid the reduction in the voltage of the battery caused by the operation of the starter 182, and to appropriately supply an electric power to e.g., the EPA motor 143 or the like. The lane departure preventing operation (and particularly, the departure avoidance control) therefore makes it possible to appropriately prevent the vehicle 1 from departing from the driving lane.

Modified Example

Even in the arbitration process according to the second embodiment, the aforementioned steps S201 and S202 of the arbitration process according to the first embodiment may be also performed. In other words, before the step S401 in FIG. 5, it may be determined whether or not the departure amount of the vehicle 1 is greater than the threshold value 1, and if it is determined that the departure amount of the vehicle 1 is greater than the threshold value 1, then, the engine 181 may be restarted on condition that the engine 181 is automatically stopped by the free-run control. By virtue of such a configuration, it is possible to stably supply an electric power to e.g., the EPA motor 143 or the like, when the EPA-LDA is performed.

Third Embodiment

A vehicle control apparatus according to a third embodiment will be explained with reference to FIG. 6 and FIG. 7. The third embodiment is the same as the first and second embodiments, except that the lane departure preventing operation and the arbitration process are partially different. Thus, in the third embodiment, the same explanation as those in the first and second embodiments will be omitted, and the same parts on the drawings will carry the same reference numerals. Basically, a different point will be explained with reference to FIG. 6 and FIG. 7.

(Configuration of Vehicle)

The ECU 17 is provided with the data acquirer 171 and the LDA controller 172 in order to perform the lane departure preventing operation. The ECU 17 is provided with the brake controller 173 in order to control the brake actuator 13. The ECU 17 is provided with the EPS controller 174 in order to control the EPS motor 143.

(Lane Departure Preventing Operation)

A lane departure preventing operation according to the third embodiment will be explained with reference to a flowchart in FIG. 6.

Figure 6:
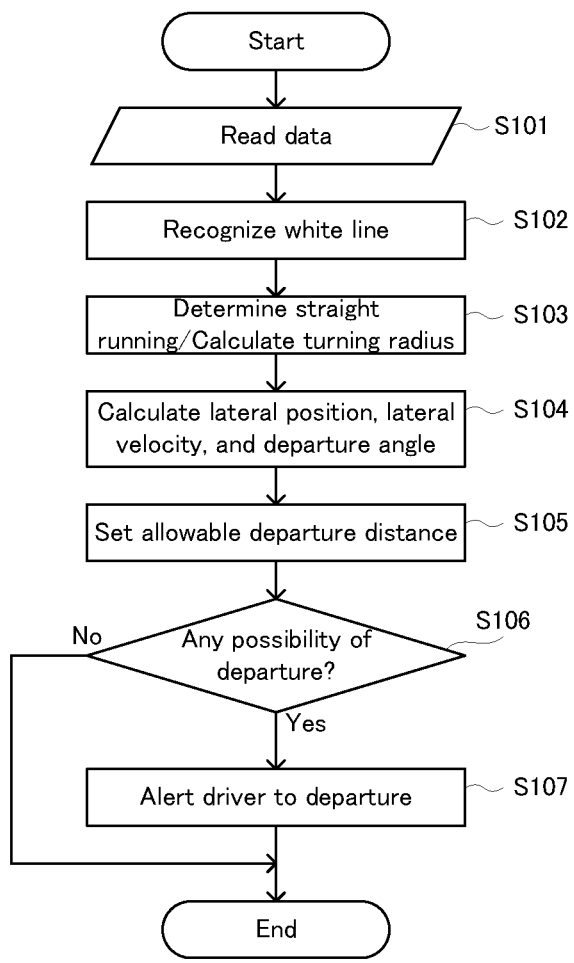
FIG. 6 is a flowchart illustrating a lane departure preventing operation according to a third embodiment.

In FIG. 6, after the step S105, the LDA controller 172 determines whether or not there is a possibility that the vehicle 1 departs from the driving lane on which the vehicle 1 is currently running (the step S106). In the determination, if it is determined that there is no possibility that the vehicle 1 departs from the driving lane (the step S106: No), the lane departure preventing operation illustrated in FIG. 6 is ended. At this time, the LDA controller 172 may turn off the flag associated with the departure avoidance control. The LDA controller 172 then may restart the lane departure preventing operation illustrated in FIG. 6 after a lapse of the first predetermined period.

On the other hand, in the determination in the step S106, if it is determined that there is the possibility that the vehicle 1 departs from the driving lane (the step S106: Yes), the LDA controller 172 alerts the driver of the vehicle 1 to the possibility of the departure of the vehicle 1 from the driving lane (the step S107). At this time, the LDA controller 172 may turn on the flag associated with the departure avoidance control. The LDA controller 172 then may restart the lane departure preventing operation illustrated in FIG. 6 after a lapse of the first predetermined period. In the third embodiment, the control flag associated with the departure avoidance control remains on until it is determined, in the step S106 performed again, that there is no possibility that the vehicle 1 departs from the driving lane.

In other words, in the third embodiment, if it is determined that there is the possibility that the vehicle 1 departs from the driving lane, it is required only to alert the driver of the vehicle 1 to the possibility of the departure. In the third embodiment, it is thus possible to avoid or prevent the departure of the vehicle 1 from the driving lane, by the operation of the driver who reacts to the alert.

(Arbitration Process)

An arbitration process according to the third embodiment will be explained with reference to a flowchart in FIG. 7. The arbitration process illustrated in FIG. 7 is performed in parallel with the lane departure preventing operation illustrated in FIG. 6.

Figure 7:
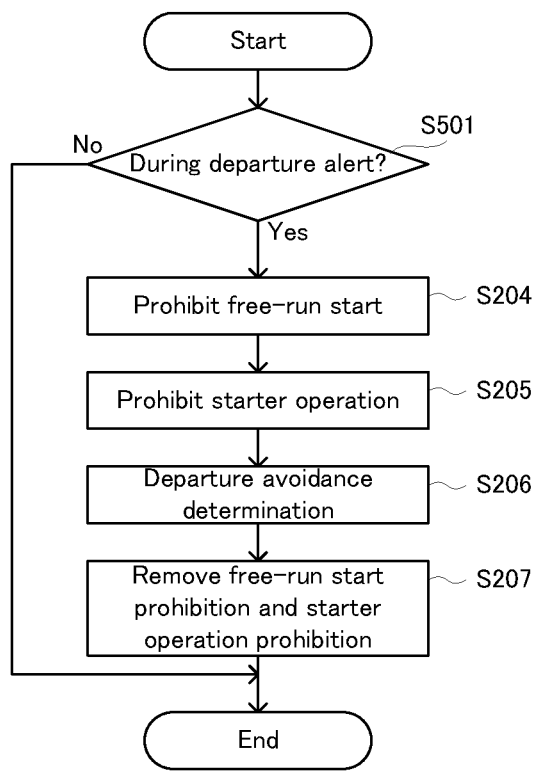
FIG. 7 is a flowchart illustrating an arbitration process according to the third embodiment.

In FIG. 7, the LDA controller 172 determines whether or not the alert in the step S107 in FIG. 6 is issued (step S501).

In the determination in the step S501, if it is determined that the alert in the step S107 is issued (i.e., when the vehicle 1 is about to depart from the driving lane) (the step S501: Yes), the process after the step S204 is performed. On the other hand, in the determination in the step S501, if it is determined that the alert in the step S107 is not issued (the step S501: No), the arbitration process illustrated in FIG. 7 is ended. Instead of the determination in the step S501, it may be determined whether or not the flag associated with the departure avoidance control is on.

(Technical Effect)

1. When the Vehicle 1 is not in Free-Run (i.e., when the Engine 181 is Driven):

If it is determined that the alert in the step S107 in FIG. 6 is issued, the start of the free-run is prohibited by the LDA controller 172. Thus, the engine 181 is not automatically stopped when there is the possibility that the vehicle 1 departs from the driving lane. It is thus possible to avoid an insufficient electric power supplied to, e.g., the EPS motor 143 or the like. As a result, for example, the operation of the steering wheel 141 by the driver makes it possible to appropriately prevent the vehicle 1 from departing from the driving lane.

2. When the Vehicle 1 is in Free-Run:

If it is determined that the alert in the step S107 in FIG. 6 is issued, the restart of the engine 181 by the free-run control (and particularly, the operation of the starter 182) is prohibited by the LDA controller 172. It is thus possible to avoid the reduction in the voltage of the battery caused by the operation of the starter 182, and to appropriately supply an electric power to e.g., the EPA motor 143 or the like. It is therefore possible to appropriately prevent the vehicle 1 from departing from the driving lane by the operation of the steering wheel 141 by the driver, even while the vehicle 1 is in the free-run.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come within the meaning and range of equivalency of the claims are therefore intended to be embraced therein.

What is claimed is:

1. A vehicle control apparatus mounted on a vehicle, which includes an engine and a motor configured to start the engine, said vehicle control apparatus comprising:

a first controller programmed to perform a departure prevention control, which is to prevent the vehicle from departing from a driving lane on which the vehicle is currently running; and a second controller programmed to perform an automatic stop control, which is to automatically stop the engine based on a predetermined stop condition being satisfied during running of the vehicle, and which is to operate the motor and to restart the engine based on a predetermined start condition being satisfied after the engine is automatically stopped, wherein said first controller is programmed to prohibit a start of an automatic stop of the engine by the automatic stop control, said first controller is programmed to perform, as a part of the departure prevention control, (i) a first determination in which a first departure amount of the vehicle from the driving lane is estimated and in which it is determined whether or not the estimated first departure amount is greater than a first threshold value, and (ii) a second determination in which a second departure amount of the vehicle from the driving lane is estimated at a different time from an estimation time of the first departure amount and in which it is determined whether or not the estimated second departure amount is greater than a second threshold value, which is greater than the first threshold value, said first controller is programmed (i) to control the motor to restart the engine via said second controller based on the engine being automatically stopped by the automatic stop control, if it is determined in the first determination that the first departure amount is greater than the first threshold value, and (ii) to prohibit the start of the automatic stop of the engine by the automatic stop control, if it is determined in the second determination that the second departure amount is greater than the second threshold value, and said first controller is programmed to generate a braking force difference between left and right wheels so that a yaw moment in a direction of preventing the vehicle from departing from the driving lane is applied to the vehicle, if it is determined in the second determination that the second departure amount is greater than the second threshold value.

2. A vehicle control apparatus mounted on a vehicle, which includes an engine and a motor configured to start the engine, said vehicle control apparatus comprising:

a first controller programmed to perform a departure prevention control, which is to prevent the vehicle from departing from a driving lane on which the vehicle is currently running; and a second controller programmed to perform an automatic stop control, which is to automatically stop the engine based on a predetermined stop condition being satisfied during running of the vehicle, and which is to operate the motor and to restart the engine based on a predetermined start condition being satisfied after the engine is automatically stopped, wherein said first controller is programmed to prohibit a start of an automatic stop of the engine by the automatic stop control, said first controller is programmed to perform, as a part of the departure prevention control, (i) a first determination in which a first departure amount of the vehicle from the driving lane is estimated and in which it is determined whether or not the estimated first departure amount is greater than a first threshold value, and (ii) a second determination in which a second departure amount of the vehicle from the driving lane is estimated at a different time from an estimation time of the first departure amount and in which it is determined whether or not the estimated second departure amount is greater than a second threshold value, which is greater than the first threshold value, said first controller is programmed (i) to control the motor to restart the engine via said second controller based on the engine being automatically stopped by the automatic stop control, if it is determined in the first determination that the first departure amount is greater than the first threshold value, and (ii) to prohibit the start of the automatic stop of the engine by the automatic stop control, if it is determined in the second determination that the second departure amount is greater than the second threshold value, said first controller is programmed to prohibit a restart of the engine by the automatic stop control, if it is determined in the second determination that the second departure amount is greater than the second threshold value, and said first controller is programmed to generate a braking force difference between left and right wheels so that a yaw moment in a direction of preventing the vehicle from departing from the driving lane is applied to the vehicle, if it is determined in the second determination that the second departure amount is greater than the second threshold value.

* * * * *